United States Patent [19]
Djorup

[11] 3,995,481
[45] Dec. 7, 1976

[54] DIRECTIONAL FLUID FLOW TRANSDUCER

[75] Inventor: Robert S. Djorup, Wellesley, Mass.

[73] Assignee: Environmental Instruments, Inc., Natick, Mass.

[22] Filed: Aug. 11, 1975

[21] Appl. No.: 603,259

Related U.S. Application Data

[62] Division of Ser. No. 330,400, Feb. 7, 1973, Pat. No. 3,900,819.

[52] U.S. Cl. .................................. 73/189; 73/204
[51] Int. Cl.² ......................................... G01F 1/38
[58] Field of Search .......... 73/204, 189; 323/75 H, 323/75 N

[56] References Cited
UNITED STATES PATENTS

3,677,085   7/1972   Hayakawa et al. .................. 73/204

*Primary Examiner*—Herbert Goldstein
*Attorney, Agent, or Firm*—Wolf, Greenfield & Sacks

[57] ABSTRACT

A fluid flow sensor apparatus for determining speed, mass flow and direction of motion relative to a fluid in which the sensor is immersed. The sensor is constructed of at least two spaced apart resistive electrical conductors which are mechanically supported to provide a degree of thermo isolation between the conductors in order to effect the determination of instantaneous fluid flow direction. A pair of the conductors is joined so that the flow around separate conductors is avoided so as to force one conductor to be a leading edge to the flow stream and the other conductor to be a trailing edge, with separate flow passing over the conductor pair. The electrical conductors can be wires or they can be metallic or resistive films which are deposited on a supporting body. The conductor is made of a material which exhibits a change in the electrical resistivity as a function of temperature. Electrical connections are provided on each end of each conductor to permit each conductor to be separately heated by its own electrical current. The paired conductors can be supported at one end so as to be cantilever in form, whereby they are joined along a major part of their length, with the lead wires for the electrical connections extending from one end of the cantilever form. The pair of electrical conductors is connected in series, and they are electrically excited so that their total series resistance is maintained constant by a feed-back operation, and the potential at the junction of the two series connected conductors can be observed to electrically change in value as a function of direction flow, and the total series output of the pair of conductors can be electrically observed to indicate fluid velocity.

2 Claims, 31 Drawing Figures

DIRECTIONAL FLUID FLOW TRANSDUCER

This is a division of application Ser. No. 330,400 filed Feb. 7, 1973, now U.S. Pat. No. 3,900,819.

SUMMARY OF THE INVENTION

This invention relates generally to sensing apparatus for ascertaining motion relative to a fluid, and more particularly to a sensing apparatus employing self-heated conductors for determining speed, mass flow and direction of motion relative to a fluid in which the sensor is immersed.

Hertofore, sensing instruments known as hot wire anemometers have been developed for measuring fluid flow parameters, as velocity and other parameters. Examples of this type of anemometer, and circuits therefor, are shown in U.S. Pat. Nos. 3,138,025, 3,333,470 and 3,352,154. However, a disadvantage of the prior art hot wire anemometers is that they are complicated, expensive and fragile. In order to use the prior art instruments it is necessary to have a highly skilled engineer or scientist set up and operate the same. A further disadvantage of the prior art hot wire anemometers is that they are limited in their operation, and they are not capable of producing a signal output which is a function of velocity and direction, and which includes an explicit sign sense.

In view of the foregoing, it is an important object of the present invention to provide a novel and improved fluid flow sensor which overcomes the aforementioned disadvantages of the prior art fluid flow sensors.

It is another object of the present invention to provide a fluid flow sensor which has no moving parts, provides an infinite resolution of incident flow, is small and compact, economical to manufacture and efficient in operation.

It is still another object of the present invention to provide a novel and improved fluid flow sensor which is rugged and can be subjected to a wide range of environmental extremes which range from operation in molten metals to operation in the cryogenic temperature range.

It is a still further object of the present invention to provide a novel and improved fluid flow sensor which employs heated metal or resistance elements rigidly supported in a manner conducive to the determination of the speed and direction of a fluid stream in which the sensor is immersed. The conductive elements may be wire elements of various cross section shapes, and they are supported in a manner to prevent exposure of the wire to the fluid stream completely around the cross section of each wire. The conductive resistant sensing elements may also comprise a hollow tubular substrate supporting member which is covered by a uniform film of a conductive material. A protective coating may be added, and it may comprise a refractory material which provides electrical insulation and electrical isolation for each sensing element so as to facilitate its mounting and support.

It is still a further object of the present invention to provide a novel and improved fluid flow sensor which includes at least two spaced apart resistive electrical conductors which are disposed parallel to each other, and connected by a thermo insulating means extending over a major portion of the length of conductors. Each of the conductors has a length at least equal to the largest cross section of the conductor. The insulating means between the sensing elements prevents aerodynamic or fluid flow completely around a single sensing element without passing over the remaining element. Direction sense is determined by differential operation of pairs of the sensing elements. The leading sensing element or conductor faces the fluid stream, and it is stream-cooled more than the conductor at the trailing edge or away from the direction of the flow of the fluid stream. The pair of conductors are connected in series and are electrically excited so that their total series resistance is maintained constant by feedback operation. The potential at the junction of the two conductors can be observed to electrically change in value as a function of direction flow, while the total series output of the element pair can be electrically observed to indicate velocity. If each conductor is made substantially longer than its width, diameter or cross section dimensions, advantage can be taken of the fact that an approximation to the cosine law response can be made. A parallel pair of sensing conductors having a figure eight cross section, with an element length to dimeter ratio of typically forty or fifty to one, can be used to determine mass flow times cosine of flow direction within the plane containing the axes of the parallel conductor elements. Pairs of sensing elements made in accordance with the invention can be used in various geometric dispositions as, for example, a pair of sensors can be mounted to determine two components of fluid flow 90° to each other. Three pairs of fluid sensors made in accordance with the invention can be disposed in an orthogonal orientation so as to provide a three dimensional fluid flow transducer without ambiguity for true 360 spherical degree operation. A pair of parallel sensing conductors may be constructed and arranged for support at one end to operate in cantilever form for pipeline, heating and ventilation applications. In the cantilever construction, the lead wires are operatively connected to the ends of the conductors in such a manner that they extend from the support end of the cantilever construction.

Other features and advantages of this invention will be apparent from the following detailed description, appended claims, and the accompanying drawings.

DESCRIPTION OF THE PREFERRED EMBODIMENTS

Figures 1, 2, 3, 4:
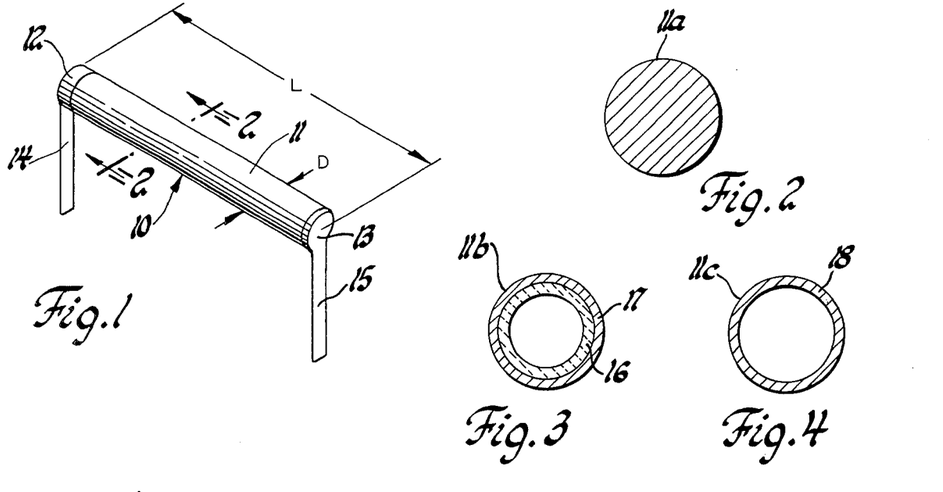
FIG. 1 is a perspective view of a single cylindrical fluid flow sensing element made in accordance with the principles of the present invention.
FIG. 2 is an elevational section view of the fluid flow sensing element structure illustrated in FIG. 1, taken along the line 2—2 thereof, and looking in the direction of the arrows.
FIGS. 3, 4, 5, 6, 7, 8, 9, 10 and 11 illustrate the cross section structure of other typical fluid flow sensing elements which may be employed in the invention.

Referring now to the drawings, and in particular to FIG. 1, the numeral 10 generally designates a sensing element made in accordance with the principles of the present invention. The body of the sensing element 10 is indicated by the numeral 11, and it is preferably equal in length "L" to the diameter "D" of the body. However, the body 11 is usually several times longer than the diameter thereof. The body 11 is uniformly resistive, and it is provided on each end thereof with a connection means 12 and 13 made of a similar material in order to avoid the introduction of thermo-electric effects or noise generation. Operatively connected to the connection means 12 and 13 are leads 14 and 15, respectively, to provide electrical and mechanical support for the body 11. The body 11 may be a wire having a solid cross section, or it may be tubular and have various cross section shapes, as is discussed hereinafter in detail.

A suitable conductor for forming the body 11 is a metal which exhibits a high non-zero temperature coefficient of resistance. Suitable conductors are ones made from platinum or rhodium. However, tungsten, gold and their alloys can be used. It should be understood that non-metals may also be used so long as they can conduct electricity. Nickel is another suitable metal that may be used in forming the sensing body 11.

FIG. 2 illustrates a sensing element body 11a which comprises a solid cylindrical cross section such as that provided by a wire.

FIGS. 3 through 11 illustrate cross section structures of other typical fluid flow sensing element bodies which may be employed in the invention. FIG. 3 shows a sensing body 11b which includes an inner hollow tubular substrate 16 which provides a strong, rigid support member that is free from stress fatigue. The substrate support member 16 may be fabricated from non-porous high density aluminum oxide. A fairly thick metal film 17 is deposited on the outer surface of the substrate support member 16. The metal film 17 may be formed from the aforementioned conductive metals. The substrate supporting member 16 extends for the length of the conductor body 11b, and the conductive film means 17 adhered thereto also extends for the length of the body 11b. The substrate supporting body 16 may be made from other suitable materials that are electrically non-conductive, such as aluminum silicate or anodized aluminum and other ceramic materials. Aluminum oxide is most useful because of its high strength, extreme temperature stability, and because of its purity and lack of reaction with the deposited metal film 17.

The conductive metal film 17 may be placed on the refractory substrate cylinder 16 by any suitable deposition technique, including firing, fusing and sintering of noble-metal resinate solutions. Evaporative deposition of the metal or resistive films may be used for the deposition of metal films which will be employed in a restricted class of operation at or near the deposition temperatures.

Where higher temperature coefficients than the 2,500 to 4,630 parts per million per degree Centigrade which are realized by the platinum group metals and their compounds are desired, tungsten in wire or film form can be used or metals such as nickel with its TC of 6720 ppm/° C provides higher sensitivity. As far as ease of handling and material and compound availability together with performance life and stability are concerned, platinum and its compounds are to be preferred.

The sensing element or electrical conductor of a body 11 which is exposed to a fluid flow stream, gaseous or liquid, including molten metal, must be a resistive conductor having a non-zero temperature coefficient of resistance. It may be either positive going, which is the rule for most metals, or it may be negative going. Where the temperature coefficient is low or near zero, the sensitivity of the sensing element to fluid flow is reduced since a smaller resistance change will be realized for given flow excursion.

FIG. 4 illustrates a sensing element body 11c which comprises a hollow tubular metal conductor 18 that is appropriate for use in cases where severe environmental stress is encountered.

Figure 5:
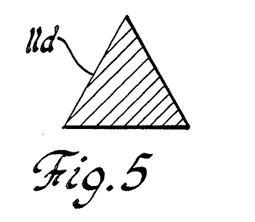
Figure 6:
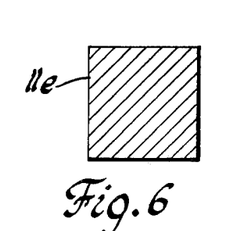
Figure 7:
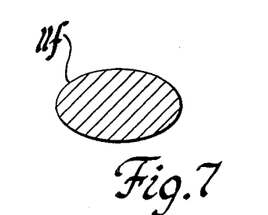

FIGS. 5, 6 and 7 illustrate solid metal conductor cross sections which are triangular, rectangular and elliptical, respectively. The triangular conductor body is indicated by the numeral 11d, the square or rectangular conductor body is indicated by the numeral 11e, and the elliptical conductor body is indicated by the numeral 11f.

Figure 8:
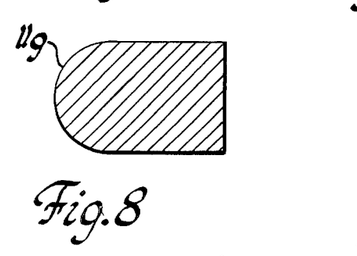

FIG. 8 illustrates a solid metal conductor body 11g which has a leading semicircular edge, with the rear edge being straight and perpendicular to a pair of parallel side edges.

Figures 9, 10, 11:
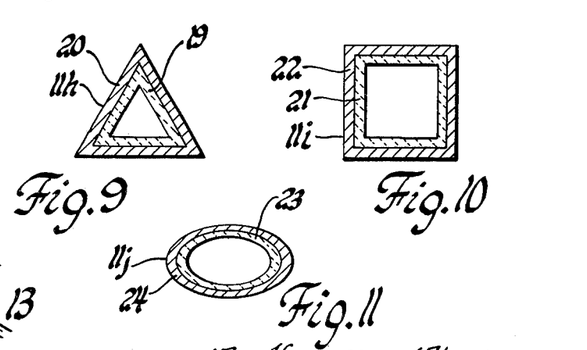

FIGS. 9 and 10 illustrate two more cross section shapes which may be used in forming the conductor body. FIG. 9 shows a conductor body 11h having a tubular and triangular in cross section shaped substrate support member 19 on which is deposited a conductive triangular metal film means 20. FIG. 10 illustrates a conductor body 11i which has a tubular and rectangular substrate support member 21 on which is deposited a rectangular conductive metal film means 22. It will be understood that the substrate support member and the metal film means may be formed to other polygonal cross section shapes.

FIG. 11 illustrates still another cross section shape for a conductor body 11j which is elliptical in cross section. The substrate support member 23 is tubular and elliptical in cross section and it carries the conductive elliptical metal film 24.

Various cross section shapes have been illustrated for use in forming the conductor body 11, but it should be understood that a round cross section is the most convenient to fabricate and is used hereinafter for the illustrations of the invention. Aerodynamic considerations also indicate that a round cross section or a semi-circular leading edge is an optimum or most desirable leading edge shape.

Figure 12:
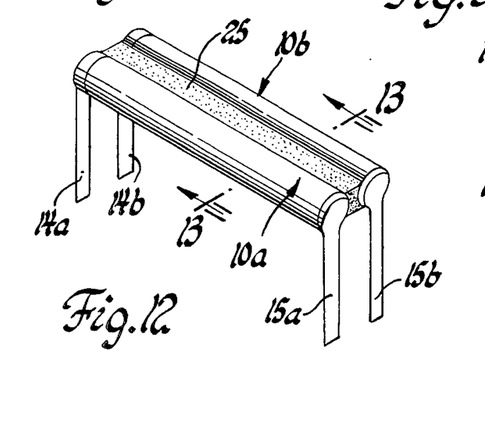
FIG. 12 is a perspective view of a fluid flow sensor made in accordance with the principles of the present invention and which employs a pair of spaced apart, parallel sensing elements of the type illustrated in FIG. 1.

FIG. 12 is a perspective view of a fluid flow sensor made in accordance with the principles of the present invention, and which employs a pair of spaced apart parallel sensing elements of the type illustrated in FIG. 1. The two sensing elements are indicated by the numerals 10a and 10b. The sensing elements 10a 10b are disposed parallel to each other, and they are interconnected by a thermo insulating means 25 which extends over a major portion of the length of the sensing elements or conductors 10a and 10b. The thermo insulating means 25 forms a bridging or fusing material, and the type of material which is used is determined primarily by its ability to withstand the intended environment and the maximum surface operating temperature of the sensing conductors 10a and 10b. The bridging means 25 may be formed from a suitable fused silica, silicone rubber, a suitable plastic, or a suitable adhesive.

The thermo insulating means 25 is provided to thermally separate the conductors 10a and 10b, and thereby force a cooling difference. If the support member 25 were common, thermally, with the two conductors, it would not be possible to develop a sufficiently large front to back difference in thermal boundary layer thickness so that it could be easily detected electrically. If the conductors 10a and 10b are isolated by a gap between them, the fluid flow pattern could connect and it would not be possible to detect any difference of cooling between the front and back conductors, regardless of the fluid flow direction. By closing the gap between the conductors 10a and 10b with the support plate 25, a cooling difference is brought about by the wake of one conductor obscuring the other conductor.

The front to back ratio of thermo boundary layer thickness must be substantial in order to discriminate direction by electrical means without ambiguity caused by the shift of the stagnation region around the leading edge of the sensor shape. If the sensor size is small with respect to the aerodynamic size of the support member 25, the support boundary layer geometry will govern sensitivity to motion of the fluid with respect to the sensor. The sensor itself must define the leading edge so that the stagnation region ahead of the sensor, into the fluid stream, is small compared to the sensor size. This is the reason why it is desirable to make the sensor and its support as one member. If the sensor thickness is a little more than two sensor diameters, including the fusing or aerodynamic barrier 25 between the two conductors 10a and 10b, the sensor can go through roll angles very near plus or minus 90°. If the separation is greater, the body 25 separating the conductor elements may look like a lifting body complicating the fluid flow pattern around the body 25.

A discussion of heat transfer from a uniformly curved heat transfer surface is discussed in U.S. Pat. No. 3,604,261, and on page 298 of a textbook entitled "Boundary-Layer Theory", by Dr. Hermann Schlichting, Sixth Edition, Copyright 1968, and published by McGraw-Hill Book Company of New York.

Figure 13:
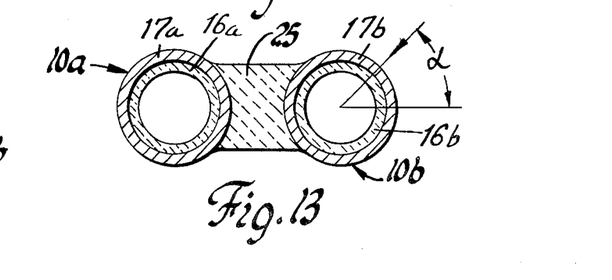
FIG. 13 is an elevational section view of the fluid flow sensor structure illustrated in FIG. 12, taken along the line 13—13 thereof, and looking in the direction of the arrows.

FIG 13 illustrates a typical figure eight or dumb-bell cross section for a sensor of the type illustrated in FIG. 12. When the sensing elements 10a and 10b are mounted in close proximity, with the gap therebetween being less than the diameter of the sensing elements 10a and 10b, the angle of incidence of impinging flow $\alpha$, can go to almost plus or minus 90°, with the sensing elements 10a and 10b being able to discriminate fluid flow direction. As the spacing between the sensing elements 10a and 10b is increased, the range of $\alpha$ is decreased, because the film space between the sensing elements 10a and 10b acts as a lifting body in accordance with conventional aerodynamic theory. FIG. 13 illustrates a typical embodiment of the invention.

Figures 14, 15, 16, 17:
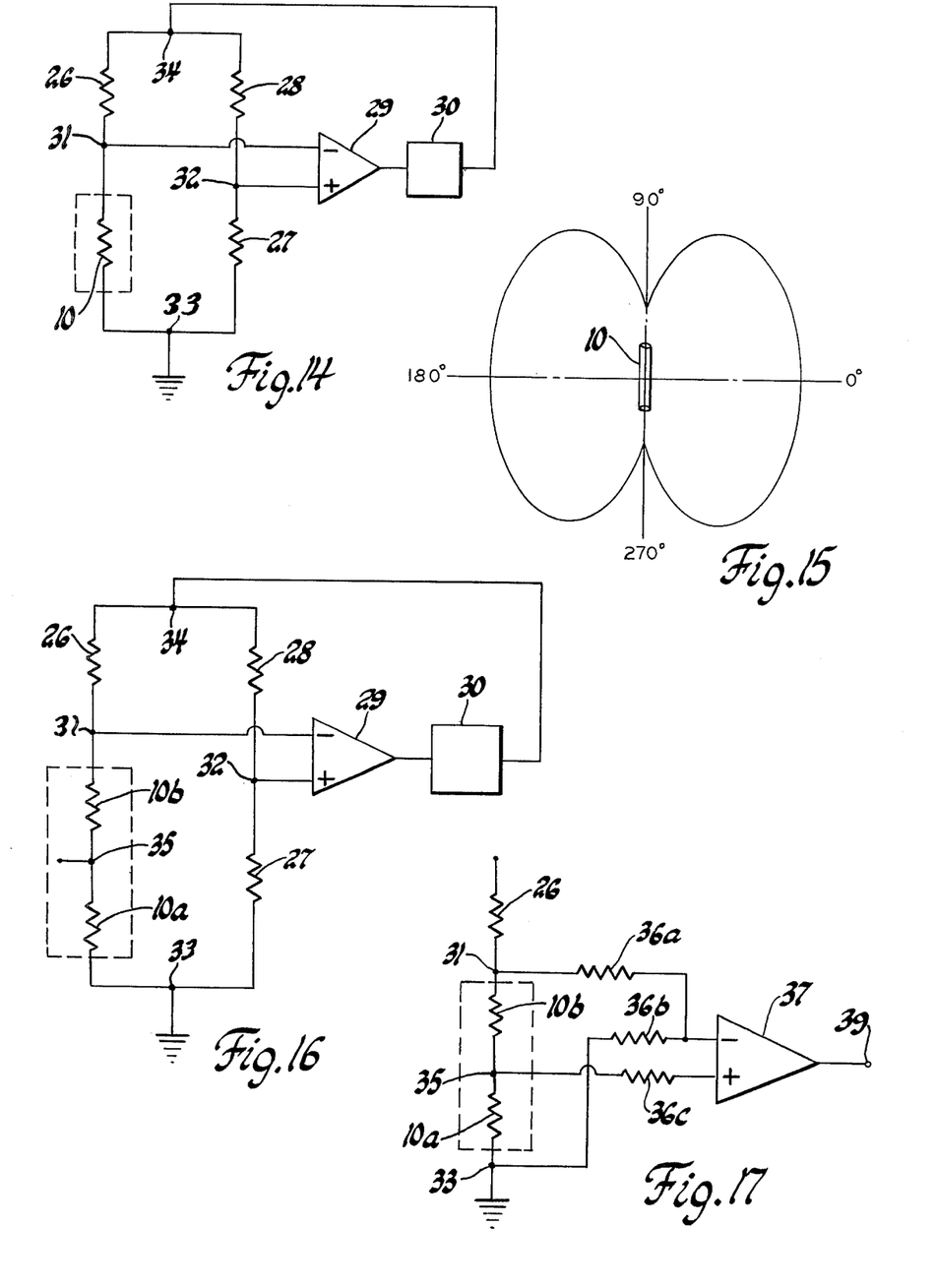
FIG. 14 is a schematic circuit diagram of an illustrative circuit which may be used to excite a single sensing element as that illustrated in FIG. 1.
FIG. 15 illustrates the polar response of a single sensing element of the type illustrated in FIG. 1 when it is excited by the circuit of FIG. 14.
FIG. 16 illustrates the circuit of FIG. 14 modified to include a pair of fluid flow sensing elements of the type illustrated in FIG. 12.
FIG. 17 illustrates a portion of the circuit of FIG. 16 provided with a comparator, to compare the resistance of the fluid flow sensing elements of FIG. 12.

FIG. 14 illustrates a four arm Wheatstone bridge circuit which may be used to excite a single sensor element 10 of the type illustrated in FIG. 1. As shown in FIG. 14, the sensor element 10 is one of the resistors in the bridge circuit. Another arm of the bridge circuit is the resistor 26 which passes the full resistor 10 heating current. Another bridge circuit arm is the resistor 27 which is used as a temperature sensor exposed to the fluid stream, and which has a non-zero temperature coefficient of resistance which is the same as the velocity sensing element 10. The remaining bridge circuit arm comprises the resistor 28 which has a value selected to establish bridge balance at the desired overheat operating temperature of the self-heated sensing element 10. An amplifier 29 is operatively connected to read the error signal which is developed between the points 31 and 32, and to amplify the signal and feed the input to a current amplifier 30 whose output is fed back to the top of the bridge circuit at point 34 to provide bridge excitation. Amplifier 29, together with current amplifier 30, produces a small offset voltage output when the bridge is in perfect balance in order to provide automatic turn-on of the feedback circuit when power is applied. The voltage appearing across the sensor element or resistor 10 between points 31 and 33 can be used to indicate $\rho$ V or mass flow. If $\rho$ is constant, the indication will be a velocity signal. The signal is non-linear and contains a constant term which is the zero flow heating signal, a fourth root term as a function of flow, and turbulence component which results from fluctuations in the flow term.

FIG. 15 illustrates the polar response of a single sensing element 10. The dumb-bell pattern follows an approximate rectified cosine when the fluid flow vector is contained within the plane of the drawing. A three-dimensional development of the fluid flow vector for 360° spherical shape will be a torus or doughnut without a hole. The sensor element 10 is shown perpendicular to the 0° – 180° axis.

FIG. 16 illustrates a modification of the Wheatstone bridge circuit of FIG. 14 wherein the sensing resistor 10 has been replaced by a pair of parallel, spaced apart, sensing elements 10a and 10b of the type illustrated in FIG. 12. In FIG. 16, the sensing elements 10a and 10b are connected in series, electrically, so as to pass the same electrical current through both conductors, thus eliminating any false differential which may be caused by different excitation levels. By operating the total resistance of both conductors 10a and 10b at a constant resistance, by means of the aforedescribed feedback, the largest possible signal swing is caused to occur at the point 35 where the conductors 10a and 10b are electrically tied together.

When the midpoint voltage at the point 35 between sensing elements 10a and 10b is invariant, while fluid flow is present, the fluid flow direction is contained by a plane parallel to the axis of the sensing elements 10a and 10b and perpendicular to a plane containing their axes. For all other fluid flow conditions, point 35 will move as a signal shift caused by the change in resistance of sensing element 10a relative to sensing element 10b, induced by the different heat loss seen by each sensing element.

FIG. 17 illustrates a modification of the bridge circuit of FIG. 16 wherein a comparator 37 is used to compare the resistance off the sensing elements 10a and 10b. Resistors 36a, 36b and 36c are the comparator input resistors. The output at point 39 will go positive if the resistance of sensing elements 10a is increased by fluid flow against sensing element 10b, and said output will go negative if the fluid flow is against sensing element 10a.

Figures 18, 19, 20, 21, 22:
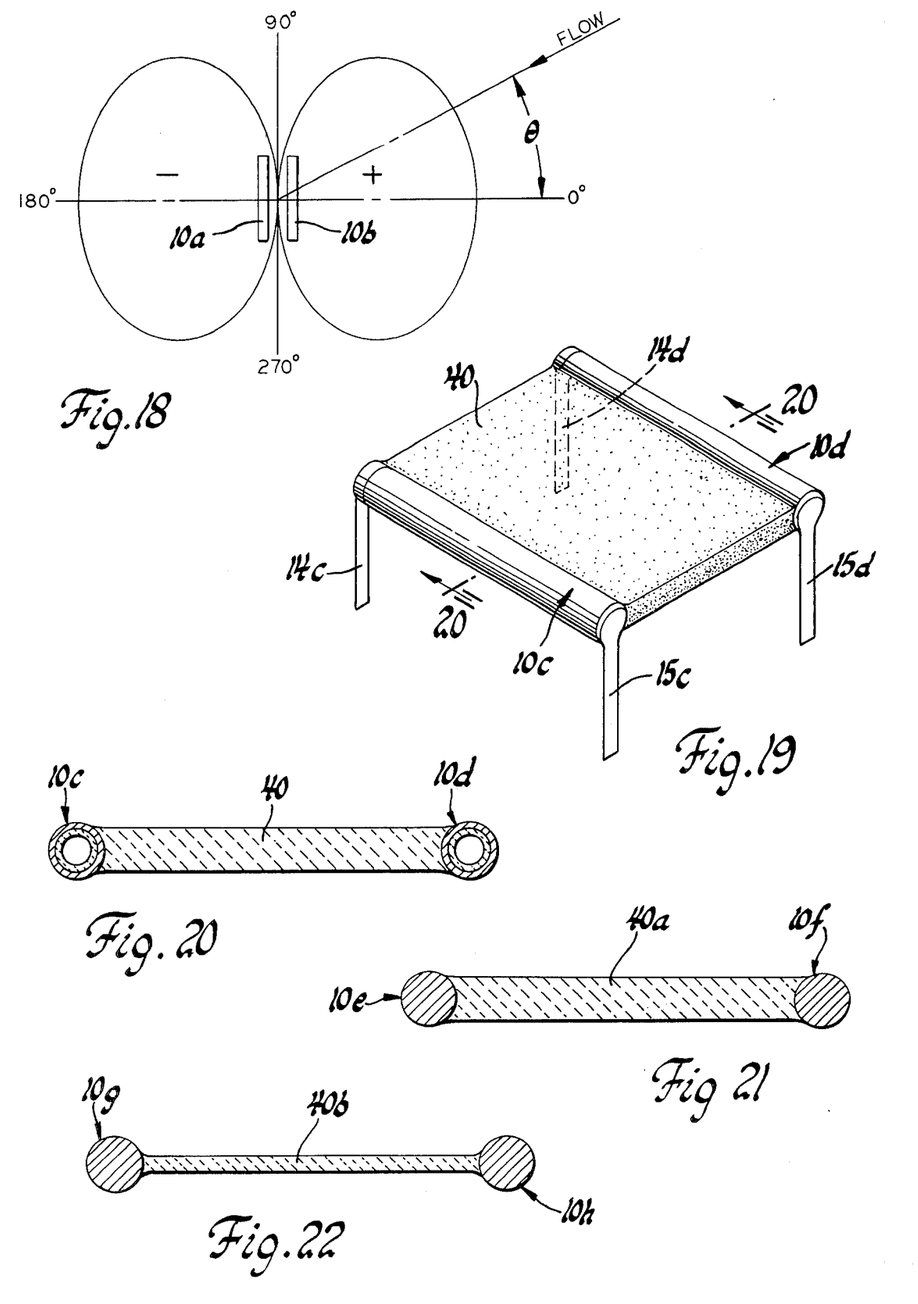
FIG. 18 illustrates the polar response of the pair of fluid flow sensing elements of FIG. 12 when excited by the circuits of FIGS. 16 and 17.
FIG. 19 is a perspective view of a modified fluid flow sensor made in accordance with the principles of the invention, and wherein the sensing elements are separated by a filler plate.
FIG. 20 is an elevational section view of the fluid flow sensor structure illustrated in FIG. 19, taken along the line 20—20 thereof, and looking in the direction of the arrows.
FIGS. 21, 22, 23 and 24 are cross section views, similar to FIG. 20, and showing modifications of the sensing element structure and filler plate structure which may be employed in carrying out the invention.

FIG. 18 illustrates the output which can be realized by a pair of sensing elements as illustrated in FIG. 12 when excited by the circuits of FIGS. 16 and 17, and wherein the output 39 of FIG. 17 is used to switch the sign sense of an amplifier which is used to condition the velocity signal taken between points 31 and 33 of FIG. 16. It will be noted that each lobe will be of different electrical sign and that the output, when looked at in cartesian form, will approximate a cosine function using the illustrated co-ordinate system of FIG. 18. In general, the output will be in the form of $(\rho/\rho_o)\ V_w\ \text{Cosine}\ \theta,$ where $\rho$ is the ambient density, $\rho_o$ is reference density at standard conditions, $V_w$ is the fluid velocity, and $\theta$ is the azimuth angle of the fluid velocity vector.

FIG. 19 is a perspective view of a modified fluid flow sensor made in accordance with the invention, and wherein a pair of sensing elements 10c and 10d are separated by a filler plate 40. The sensing element leads 14c and 15c, and 14d and 15d, respectively, are employed for electrical and mechanical connections. FIG. 20 shows a cross section view of the structure of the sensor shown in FIG. 19. FIG. 20 shows the conductor sensing elements 10c and 10d as being cylindrical in cross section, and as employing a substrate supported conductive surface film.

FIG. 21 is a cross section view of a sensor, similar to the sensor of FIG. 21, and showing the use of parallel wires to form sensing elements 10e and 10f carried on the filler support plate 40a.

FIG. 22 is a cross section view of a sensor, similar to the sensor of FIG. 21, and showing a modification wherein the filler support plate 40b is a thin sheet.

Figures 23, 24, 25:
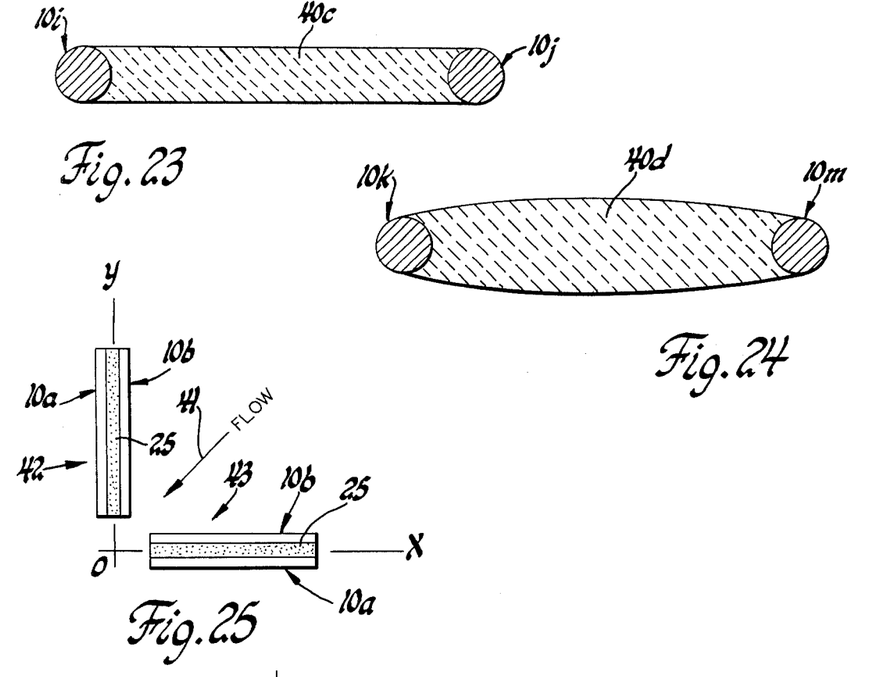
FIG. 25 illustrates an embodiment of the invention wherein a pair of fluid flow sensors are oriented along two perpendicular axes to determine two 90° components of flow.

FIG. 23 is a cross section view of a sensor, similar to the sensor of FIG. 21, and showing a filler support plate 40c equal in thickness to the diameter of the sensing elements 10i and 10j.

FIG. 24 is a cross section view of a sensor, similar to the sensor of FIG. 21, and showing a symmetrical cross section supporting member 40d which is thicker at its center than the diameter of the sensing elements 10k and 10m, so as to form an elliptical cross section sensor.

It will be seen that the leading edge of a total sensor body made in accordance with the invention is defined by the geometry of the conducting sensing elements.

FIG. 25 illustrates the geometrical orientation of a perpendicular pair of transducers 42 and 43 made in accordance with the structure of FIG. 12, and which can be used to determine two components of incident flow 41 against the transducers. The transducers 42 and 43 are oriented along the illustrated "Y" and "X" axes, respectively, on either a common plane or on parallel planes.

Figure 26:
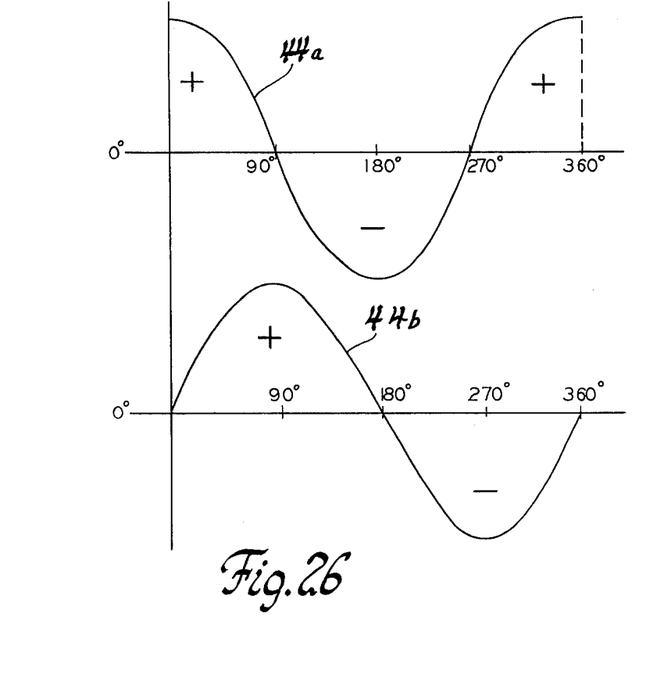
FIG. 26 illustrates the two phase response which can be realized by the embodiment of FIG. 25.

FIG. 26 illustrates the relationship of output signals which can be realized by the perpendicular arrangement of FIG. 25, so as to produce a cosine function and a sine function which explicitly define fluid flow velocity and direction component, respectively. The cosine function is indicated by the curve marked 44a and the sine function is indicated by the curve marked 44b. The signal output from a transducer 42 or 43 is maximum when the incident flow 41 is normal to or is perpenducular to the transducer axis.

Figure 27:
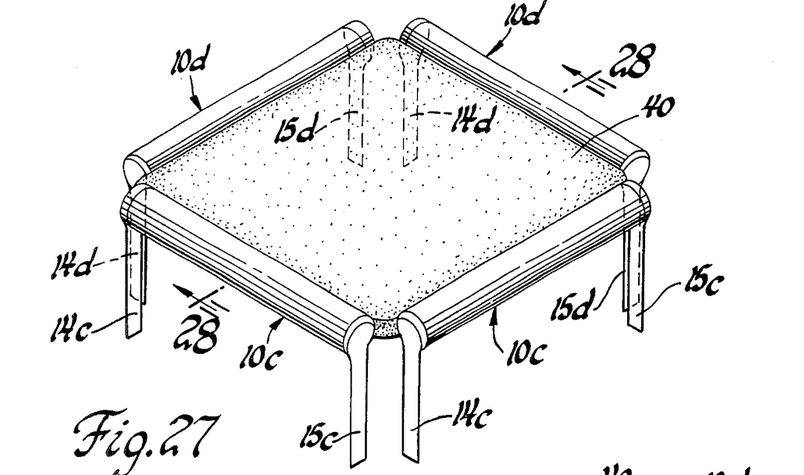
FIG. 27 illustrates still another embodiment of the invention which includes two oppositely disposed pairs of fluid flow sensing elements mounted on a common square filler support body.

FIG. 27 illustrates the orientation of two oppositely disposed pairs of sensing elements mounted on a square filler support plate 40. The structure of FIG. 27 is the same as the structure of FIG. 19 with an additional pair of sensing elements 10c and 10d. The structure of FIG. 27 may be used to determine two components of fluid flow 90° to each other.

Figure 28:
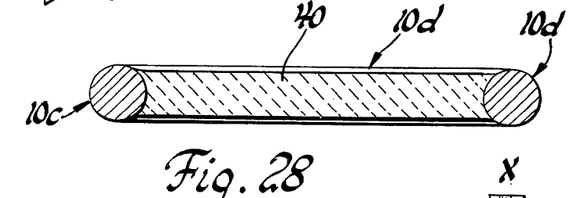
FIG. 28 is an elevational section view of the structure illustrated in FIG. 27, taken along the line 28—28 thereof, and looking in the direction of the arrows.

FIG. 28 is a cross section view of the structure of FIG. 27, and illustrates the forming of the sensing elements 10c and 10d from solid wires.

Figure 29:
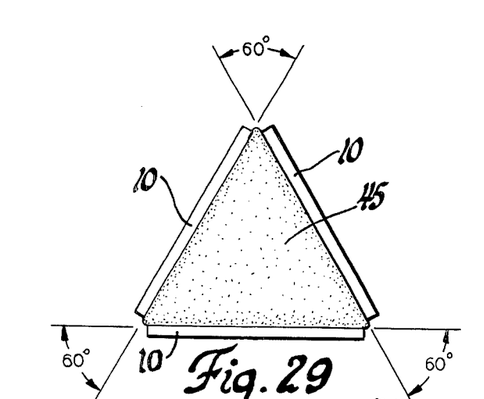
FIG. 29 illustrates a further embodiment of the invention which includes three fluid flow sensing elements mounted on an equilateral, triangular filler plate to determine three components of fluid flow in the same plane.

FIG. 29 illustrates a further form of a sensing apparatus which includes three sensing elements 10 of the type illustrated in FIG. 1, and which are mounted on an equilateral, triangular filler support plate 45 made from the same material as the previously described support plates 25 and 40. The three sensing elements 10 are operated in electrical series, as the resistor 1 of FIG. 14 or the resistors 10a and 10b of FIG. 16. Two comparators as used in the circuit of FIG. 17 are employed to determine which sensing element 10 "sees" the incident flow. The three phase sinusoidal signal which is developed as a result of fluid flow magnitude and direction can be further processed so as to be compatible with three phase devices such as synchro repeaters by the use of suppressed carrier modulation of the three output signals.

Figure 30:
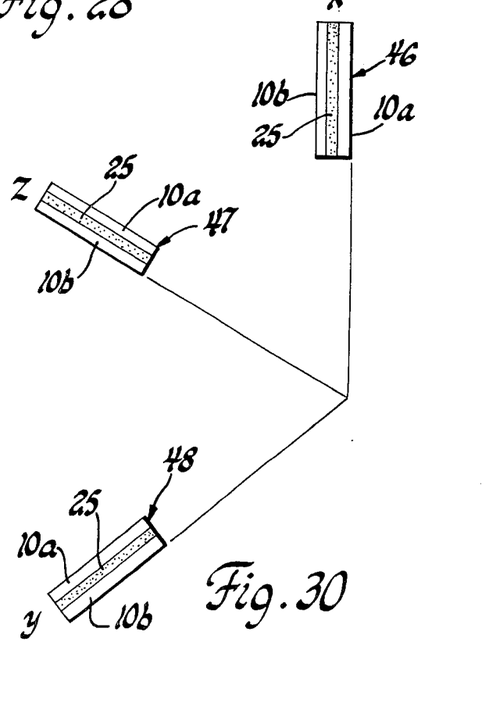
FIG. 30 illustrates another embodiment of the invention which includes three fluid flow sensing elements of the type illustrated in FIGS. 12 and 19, and which are disposed in an orthogonal orientation for determining the three components of a fluid flow vector within 360° free space.

FIG. 30 illustrates the orthogonal orientation of three sensors made as shown in FIG. 12, generally indicated by the numerals 46, 47 and 48. The sensors 46 is disposed on the "X" axis, the sensor 47 is disposed on the "Z" axis, and the sensor 48 is disposed on the "Y" axis. The structural disposition of FIG. 30 permits the static sensors to be used as a three-dimensional fluid flow transducer without ambiguity for true 360° spherical degree operation.

It will be understood that the static sensors illustrated in FIGS. 19, 25, 27 and 30 are each excited by the circuit means illustrated in FIGS. 16 and 17.

Figure 31:
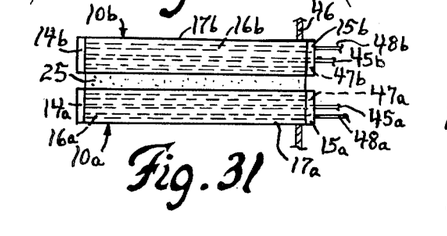
FIG. 31 is an elevational view of a cantilever form sensing element made in accordance with the principles of the present invention.

FIG. 31 is a plan view of a sensor apparatus made in accordance with the invention and wherein the sensor is supported at an inboard end in cantilever form. The cantilever sensor of the type shown in FIG. 31 would be used for sensing fluid flow in pipe lines and in heating and ventilation applications. The cantilever structure of FIG. 31 shows a pair of conductors 10a and 10b having a structure similar to the structure of the sensor of FIG. 12, and wherein the sensor is supported at an inboard end thereof by a suitable support structure indicated by the numeral 46. The conductors 10a and 10b are joined together along a major part of their length by a filler support plate 25. The conductors 10a and 10b are of the structure shown in FIG. 3 wherein a substrate support member 16a and 16b is used in the conductors 10a and 10b, respectively. An outer conductor metal film, as 17a and 17b, is adhered to the outer surface of each of the substrate support members 16a and 16b, respectively. The outboard ends of the conductors 10a and 10b are provided with suitable electrical connection means 14a and 14b, respectively, which may enclose the outboard ends of these conductors. The outboard end electrical connection means 14a and 14b are operatively connected to suitable lead wire means 45a and 45b, respectively, which extend through the substrate members 16a and 16b and out through bores 47a and 47b, respectively, formed through the inboard electrical connection means 15a and 15b. The inboard electrical connection means 15a and 15b are provided with suitable lead wire means 48a and 48b, respectively. The cantilever type sensor of FIG. 31 would operate in the same manner as the previously described sensor embodiments.

The sensing conductor 10 can be operated at any temperature over ambient temperature so long as the conductor material and its substrate or support member, if used, is stable and exhibits no property changes over the operating temperature range. Platinum sensing conductors can be operated at a temperature up to the 1500° centigrade range, so long as they are not vacuum deposited conductors.

Usually, when the transducer of the present invention is operated in water, an operating temperature of 15° to 40° centigrade above sensed ambient temperature is quite satisfactory, providing a good compromise between operating power and sensitivity. In air, the usual operating temperature is 50° to 150° centigrade above sensed ambient temperature, although some applications suggest overheat operating temperatures as high as 300° to 400° centigrade. Excellent performance results have been realized with overheat temperatures of 90° to 100° centigrade.

The fluid flow transducer of the present invention can be used in gases, water and other fluids, and it may be mounted in closed pipes or used unbounded in free space.

It will be understood that when the conductor is made to the construction of FIG. 3, with a substrate support member, that the metallic conducting coating 17 on the support member 16 may in turn be provided with a protective outer coating such as a glaze of fused silica or aluminum oxide or other material, so that the conductor will resist abrasion from sand, dust and the like when it is in use.

While it will be apparent that the preferred embodiments of the invention herein disclosed are well calculated to fulfill the objects above stated, it will be appreciated that the invention is susceptible to modification, variation and change.

What is claimed is:
1. Apparatus for measuring fluid flow comprising
   a. a dual element sensor having a pair of closely spaced, elongate, temperature sensitive elements whose electrical resistance is a function of temperature, the pair of elements extending side by side along the sensor's longitudinal axis and having an electrically non-conductive thermal insulator disposed between the two elements which prevents fluid flow therebetween,
   b. means connecting the two elements of the dual element sensor in series,
   c. means connected to the dual element sensor and forming a bridge circuit with the two series connected elements of the sensor being in one arm of the bridge,
   d. means for causing a current to flow through the two series connected elements to cause them to be heated above the ambient temperature, and
   e. regulating means connected to the bridge circuit for regulating the current to cause the total resistance of the series connected elements to be held constant for constant ambient temperature.
2. Apparatus according to claim 1 for measuring fluid flow, further including
   f. a second sensor for sensing the ambient temperature, the second sensor having an element whose resistance is a function of temperature, the second sensor having its element connected in an arm of the bridge circuit separate from the arm having the elements of the dual element sensor, and the second sensor causing the regulating means to alter the regulated current to compensate for changes in the ambient temperature.

* * * * *